(12) United States Patent
Tamura et al.

(10) Patent No.: US 8,465,213 B2
(45) Date of Patent: Jun. 18, 2013

(54) OPTICAL MODULE

(75) Inventors: Kenichi Tamura, Hitachi (JP); Yoshiaki Ishigami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 201 days.

(21) Appl. No.: 12/967,202

(22) Filed: Dec. 14, 2010

(65) Prior Publication Data

US 2012/0027364 A1 Feb. 2, 2012

(30) Foreign Application Priority Data

Jul. 30, 2010 (JP) .................................. 2010-171531

(51) Int. Cl.
G02B 6/42 (2006.01)

(52) U.S. Cl.
USPC .............................................. 385/92; 385/93

(58) Field of Classification Search
USPC ...................................................... 385/88–94
See application file for complete search history.

(56) References Cited

U.S. PATENT DOCUMENTS

| 7,850,373 B2 * | 12/2010 | Ishigami et al. ............... 385/92 |
| 2008/0232737 A1 | 9/2008 | Ishigami et al. | |

FOREIGN PATENT DOCUMENTS

| JP | 2006-243617 A | 9/2006 |
| JP | 2008-224954 A | 9/2008 |
| JP | 2008-268752 A | 11/2008 |

OTHER PUBLICATIONS

Japanese Office Action dated Feb. 19, 2013, (and English translation thereof) in counterpart Japanese Application No. 2010-171531.

* cited by examiner

Primary Examiner — Uyen Chau N Le
Assistant Examiner — Michael Mooney
(74) Attorney, Agent, or Firm — Holtz, Holtz, Goodman & Chick, P.C.

(57) ABSTRACT

An optical component of an optical module has a junction surface facing an optical connector and a pair of side surfaces apart from each other in a direction perpendicular to a connection direction of the optical connector. A support member has a pair of sidewalls facing the side surfaces of the optical component respectively and concave/convex portions provided in the sidewalls and concave or convex toward the side surfaces of the optical component. The side surfaces of the optical component are fixed to the sidewalls of the support member via an adhesive, and the adhesive is also applied on surfaces of the concave/convex portions of the sidewalls.

18 Claims, 8 Drawing Sheets

OPTICAL MODULE

BACKGROUND OF THE INVENTION

1. Field of the Invention

The present invention relates to an optical module.

2. Description of the Related Art

In network systems of data centers and the like, optical fibers in addition to metal wires are used as transmission mediums for connection between a server and a server and between a server and a relay device such as a switching hub.

When the optical fibers are used, an optical module converting an electrical signal to an optical signal or converting an optical signal to an electrical signal is required.

The optical module has photoelectric conversion elements and a lens block for optically coupling the photoelectric conversion elements and end portions of the optical fibers. The photoelectric conversion elements and the lens block are fixed on a circuit board and an optical connector attached to the end portions of the optical fibers are connected to the lens block.

For example, in an optical module disclosed in Japanese Patent Application Laid-open No. 2008-224954, a lens block is fixed on a circuit board with the use of an adhesive, and a lens reinforcing member having a pressure-receiving surface receiving a pressing force from an optical connector is disposed near the lens block. In the optical module disclosed in this publication, since the reinforcing member receives the pressing force when the optical connector is connected, no stress occurs on a junction portion between the lens block and the circuit board.

SUMMARY OF THE INVENTION

A possible fixing method of the lens block may be to fix the lens block to a lens holder fixed to the circuit board with the use of an adhesive. Then, the optical connector is pressed directly against the lens block to be connected.

In this fixing method, the pressing force at the time of the connection of the optical connector is applied to an adhesive portion between the lens block and the lens holder. The pressing force, if large, might cause a problem of separating the bonded lens block and lens holder from each other.

It is an object of the present invention to provide an optical module in which an optical component is stably fixed to a support member.

According to one aspect of the present invention, there is provided an optical module including: a circuit board; a photoelectric conversion element mounted on the circuit board; an optical component served for connection with an optical connector attached to an end portion of an optical fiber to optically couple the end portion of the optical fiber and the photoelectric conversion element; and a support member fixed to the circuit board and supporting the optical component.

The optical component has a junction surface facing the optical connector and a pair of side surfaces apart from each other in a direction perpendicular to a connection direction of the optical connector, the support member has a pair of sidewalls facing the side surfaces of the optical component respectively and concave/convex portions provided in the sidewalls and concave or convex toward the side surfaces of the optical component, the side surfaces of the optical component are fixed to the sidewalls of the support member respectively via an adhesive, and the adhesive is applied also on surfaces of the concave/convex portions of the sidewalls.

Further scope of applicability of the present invention will become apparent from the detailed description given hereinafter. The detailed description and embodiments are only given as examples though showing preferred embodiments of the present invention, and therefore, from the contents of the following detailed description, changes and modifications of various kinds within the spirits and scope of the invention will become apparent to those skilled in the art.

BRIEF DESCRIPTION OF THE DRAWINGS

The present invention will be fully understood from the following detailed description and the accompanying drawings. The accompanying drawings only show examples and are not intended to restrict the present invention. In the accompanying drawings.

DETAILED DESCRIPTION

[First Embodiment]

Hereinafter, a first embodiment of the present invention will be described with reference to the drawings.

Figure 1:
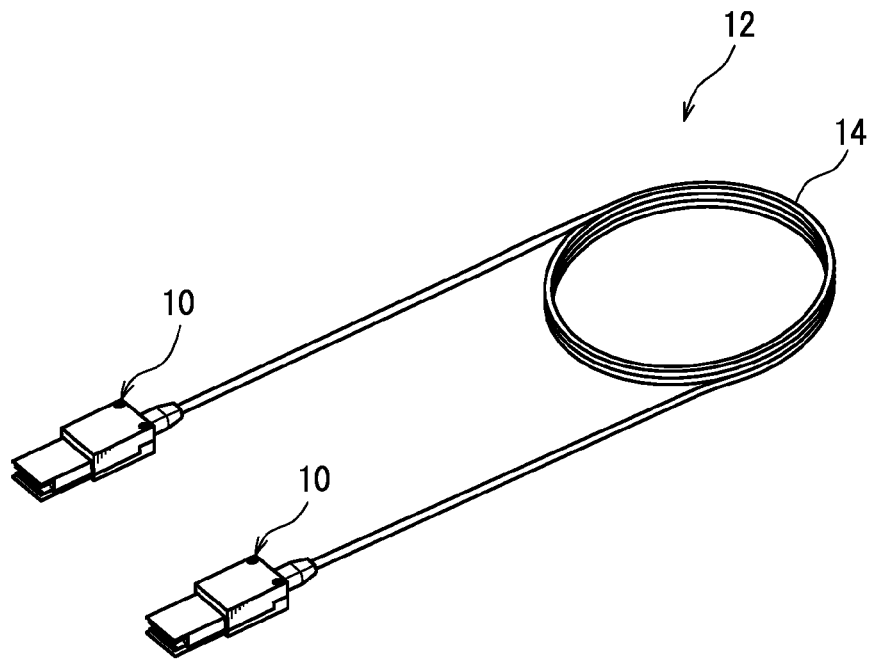
FIG. 1 is a perspective view showing a schematic structure of an optical active cable including optical modules of a first embodiment.

FIG. 1 is a perspective view schematically showing the structure of an optical active cable 12 including optical modules 10 of the first embodiment. The optical active cable 12 is composed of one optical cable 14 and two optical modules 10 attached to both ends of the optical cable 14. The optical active cable 12 is designed for 10 gigabit×12 channel parallel communication and is used for the connection between a server and a server and between a server and a relay device such as a switching hub. Therefore, the optical modules 10 are each an optical transceiver.

Figure 2:
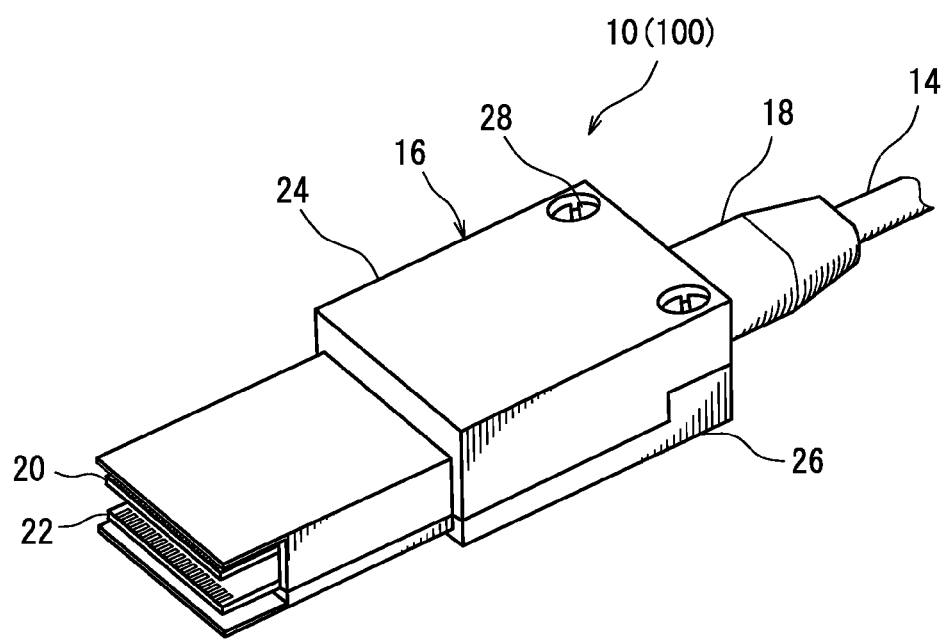
FIG. 2 is an enlarged perspective view showing the vicinity of the optical module in the optical active cable in FIG. 1.

FIG. 2 is an enlarged perspective view showing the optical module 10 with part of the optical cable 14.

The optical module 10 has a housing 16 made of, for example, metal, and the housing 16 has a stepped box shape. The optical cable 14 extends from one end of the housing 16 in terms of a longitudinal direction of the housing 16, via a sealing member 18. An opening is formed in the other end of the housing 16 in terms of the longitudinal direction of the housing 16.

In the opening of the housing 16, end portions of, for example, two circuit boards, that is, a first circuit board 20 and a second circuit board 22 are located. The end portions of the first circuit board 20 and the second circuit board 22 are insertable to a slot provided in the relay device. The housing 16 is composed of a first case 24 and a second case 26 separable from each other. The first case 24 and the second case 26 are fixed to each other with the use of, for example, two screws 28.

Figure 3:
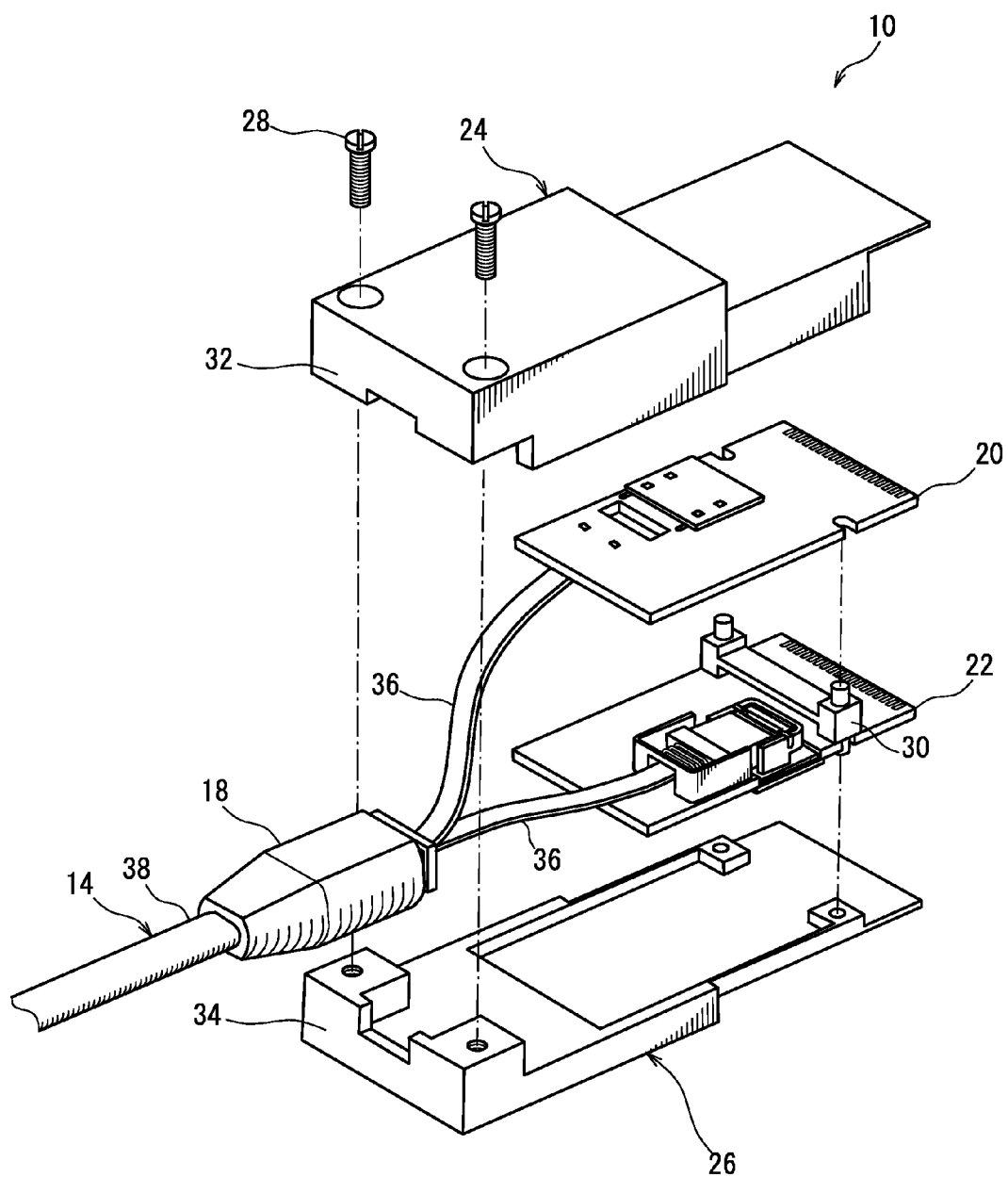
FIG. 3 is an exploded schematic perspective view showing the optical module in FIG. 2.

FIG. 3 is an exploded perspective view schematically showing the optical module 10.

Between the first circuit board 20 and the second circuit board 22, a spacer 30 is disposed. The spacer 30 defines an interval between the first circuit board 20 and the second circuit board 22 and also defines positions of the first circuit board 20 and the second circuit board 22 in the housing 16.

Cutouts are provided respectively in an end wall 32 of the first case 24 and an end wall 34 of the second case 26, and these cutouts meet each other in an end wall of the housing 16 to form one opening. In this opening, one end of the hollow sealing member 18 is fitted. The optical cable 14 is composed of, for example, two optical fiber bundles 36, 36 and a sheath 38 covering the optical fiber bundles 36, 36. The optical fiber bundles 36, 36 each include a plurality of optical fibers and extend to the inside of the housing 16 via the sealing member 18.

Figure 4:
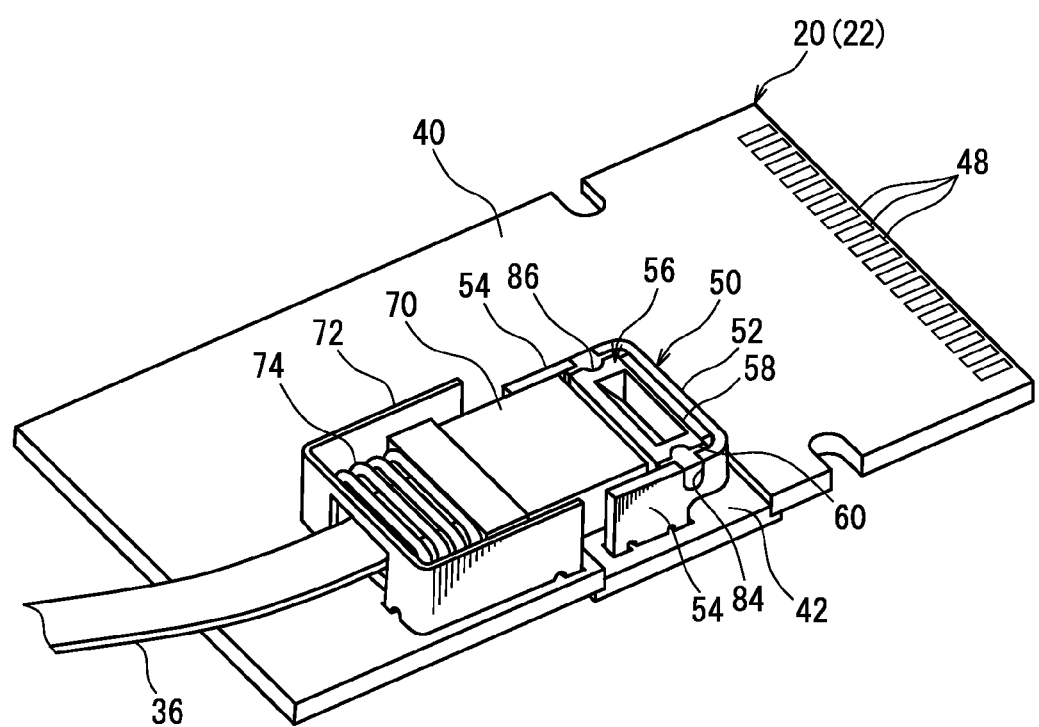
FIG. 4 is a perspective view schematically showing a first circuit board or a second circuit board in FIG. 2 with components mounted thereon.
Figure 5:
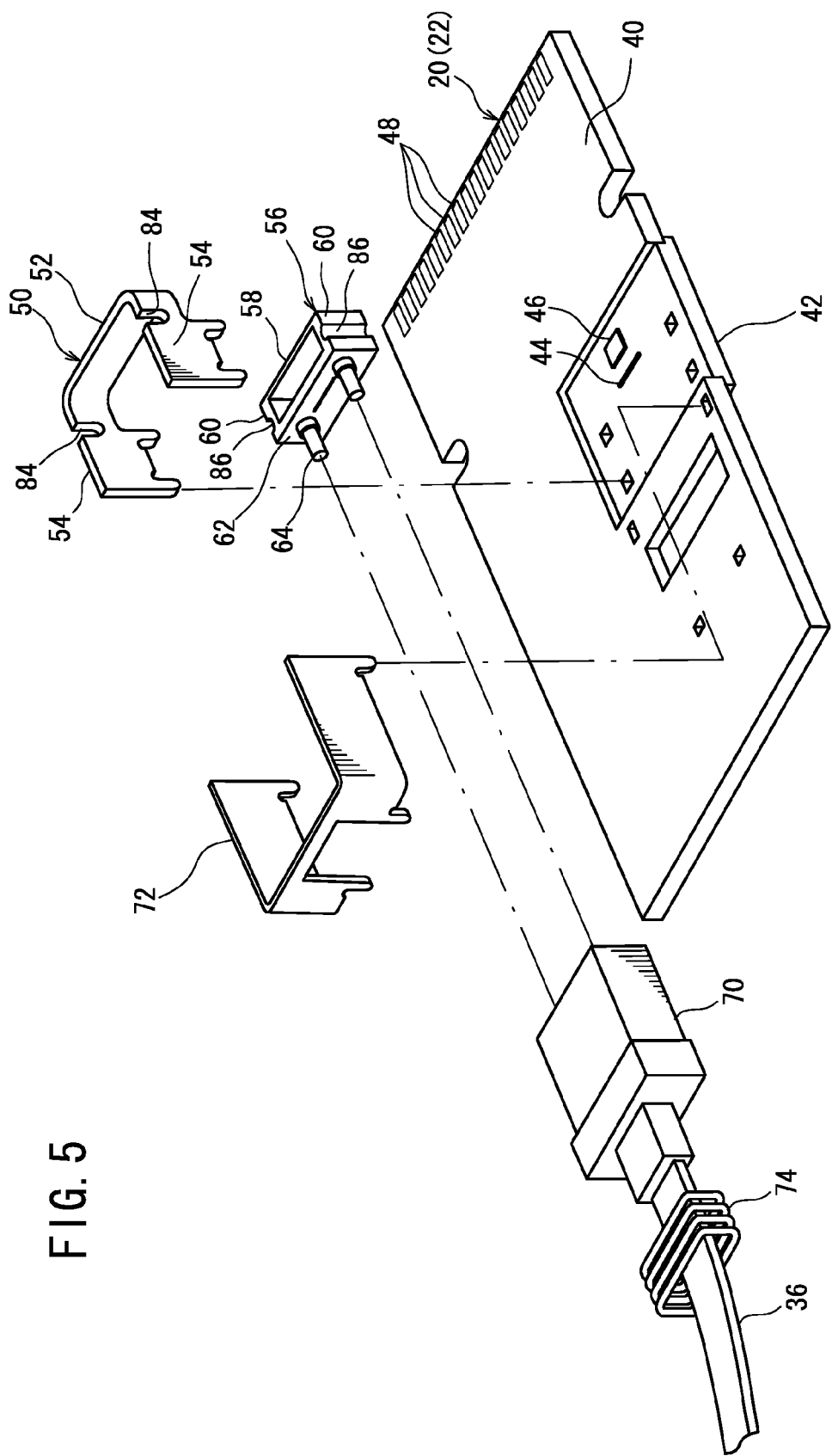
FIG. 5 is an exploded perspective view of FIG. 4.

FIG. 4 is an enlarged perspective view showing the first circuit board 20 with components mounted thereon. The first circuit board 20 inclusive of the components mounted thereon has substantially the same structure as that of the second circuit board 22. Therefore, FIG. 4 is also an enlarged perspective view showing the second circuit board 22 with the components mounted thereon. FIG. 5 is an exploded perspective view of FIG. 4.

As shown in FIG. 4 and FIG. 5, the first circuit board 20 and the second circuit board 22 each have a board main body 40 made of, for example, glass epoxy, and in the board main body 40, a cutout in a quadrangular shape is formed. A base plate 42 made of metal is attached to the board main body 40 so as to cover the cutout. That is, the first circuit board 20 and the second circuit board 22 each are composed of the board main body 40 and the base plate 42 and as a whole have a rectangular outer shape.

On the base plate 42, a photoelectric conversion element array 44 composed of a plurality of photoelectric conversion elements, for instance, is disposed. The photoelectric conversion elements are light-emitting elements such as surface emitting lasers or light-receiving elements such as photodiodes.

Further, on the base plate 42, an integrated circuit 46 electrically connected to the photoelectric conversion element array 44 is mounted. The integrated circuit 46 and the photoelectric conversion element array 44 are electrically connected by, for example, wire bonding or the like.

Concretely, when the photoelectric conversion elements are the light-emitting elements, the integrated circuit 46 is a driving circuit driving the light-emitting elements. When the photoelectric conversion elements are the light-receiving elements, the integrated circuit 46 is an amplifier circuit amplifying electrical signals from the light-receiving elements.

The first circuit board 20 and the second circuit board 22 each have a plurality of electrode terminals 48 arranged on an end portion thereof, and the first circuit board 20 and the second circuit board 22 each have a plurality of wiring patterns, not shown, which are formed on the board main body 40 to extend from the electrode terminals 48 to the vicinity of the base plate 42. End portions of the wiring patterns and the integrated circuit 46 are also electrically connected by, for example, wire bonding. Therefore, the electrode terminals 48 are electrically connected to the integrated circuit 46.

Further, on each of the base plates 42, a lens holder (support member) 50 is fixed by, for example, laser welding. The lens holder 50 is made of metal and in a plane view, it has an angular U-shape. Therefore, the lens holder 50 has one end wall 52 corresponding to a lateral bar of the U-shape and two sidewalls 54, 54 corresponding to vertical bars of the U-shape and integrally continuing to both ends of the end wall 52.

The lens holder 50 supports a lens block 56 (optical component) so as to surround three sides of the lens block 56. The lens block 56 is made of integrally molded resin and includes a lens element and a mirror element. The lens block 56 has a substantially rectangular parallelepiped outer shape, and has a rear surface 58 facing the end wall 52 of the lens holder 50 and two side surfaces 60, 60 facing the sidewalls 54, 54 of the lens holder 50.

Further, the lens block 56 has a junction surface 62 located opposite the rear surface 58. The junction surface 62 is located on an opening side defined by the sidewalls 54, 54 of the lens holder 50, and two guide pins 64, 64 projecting toward the opening are attached to the junction surface 62.

MT (Mechanically Transferable) ferrules 70 are attached as optical connectors to tips of the optical fiber bundles 36, 36, that is, tips of the plural optical fibers located inside the housing 16. The MT ferrules 70 are each joined to the lens block 56 via the opening of the lens holder 50.

Since, at this time, the MT ferrule 70 is joined while being guided by the guide pins 64, 64, the joining direction is parallel to the separation direction of the junction surface 62 and the rear surface 58 of the lens block 56 and is vertical to the separation direction of the sidewalls 54, 54 of the lens holder 50.

When the MT ferrule 70 is joined to the lens block 56, the end portions of the plural optical fibers are optically coupled to the photoelectric conversion elements of the photoelectric conversion element array 44 via the lens block 56 respectively.

To prevent the MT ferrules 70 from coming off, ferrule holders 72 are fixed to the first circuit board 20 and the second circuit board 22 respectively. Each of the ferrule holders 72 has an angular U-shape in a plane view and is disposed to face the lens holder 50. That is, the lens holder 50 and the ferrule holder 72 are disposed so that the openings thereof face each other. Between the ferrule holder 72 and the MT ferrule 70, a compression coil spring 74 is disposed, and the MT ferrule 70 is joined while being biased toward the lens block 56 by the compression coil spring 74.

[Lens Block Supporting Structure]

Hereinafter, the structure for supporting the lens block 56 by the lens holder 50 will be described.

Figure 6:
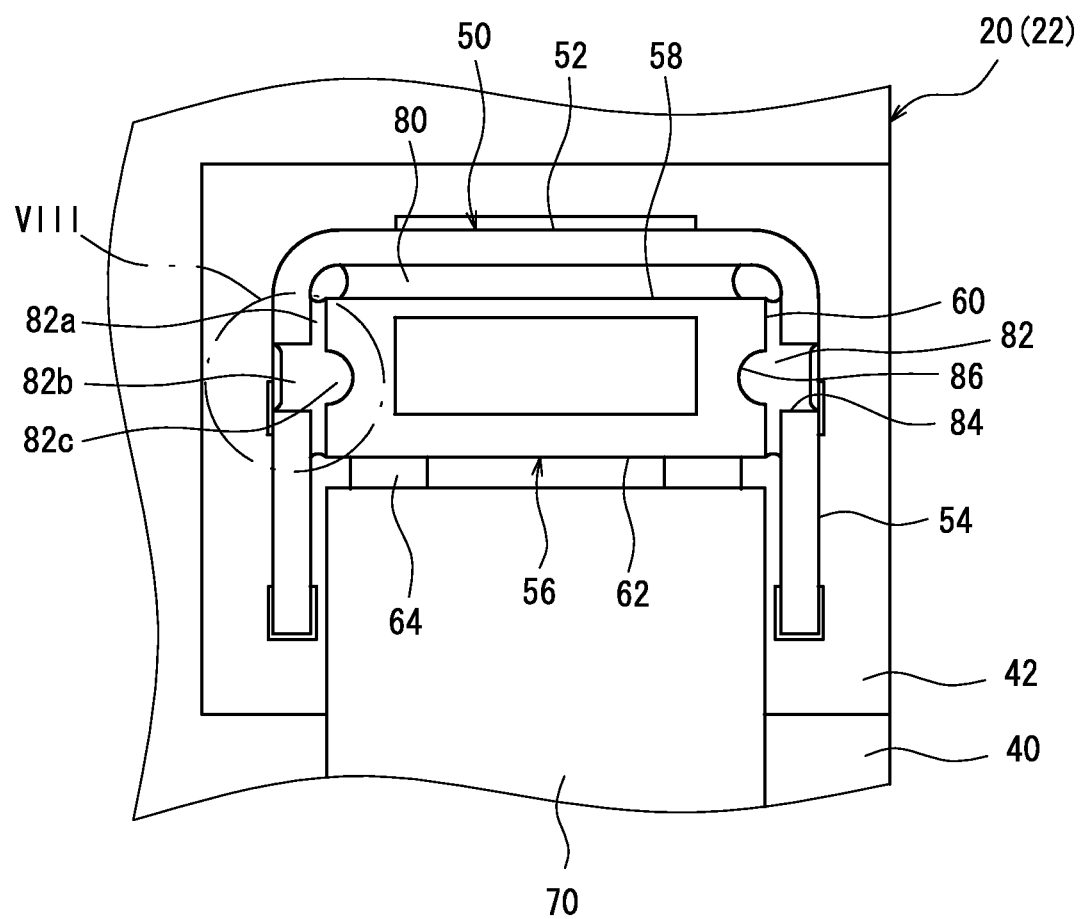
FIG. 6 is an enlarged plane view schematically showing the periphery of a lens block in FIG. 3.

FIG. 6 is an enlarged plane view schematically showing the periphery of the lens block 56.

As shown in FIG. 6, the end wall 52 of the lens holder 50 and the rear surface 58 of the lens block 56 are fixed to each other by a first adhesive portion 80 made of an adhesive that is applied therebetween and cured. Since the end wall 52 of the lens holder 50 and the rear surface 58 of the lens block 56 are both flat and substantially parallel to each other, the first adhesive portion 80 is in a layer form.

The sidewalls 54, 54 of the lens holder 50 and the side surfaces 60, 60 of the lens block 56 are fixed to each other by second adhesive portions 82, 82 made of an adhesive applied therebetween and cured.

Here, as is seen in both FIG. 4 and FIG. 5, the sidewalls 54, 54 of the lens holder 50 have cutouts 84 formed in their areas facing the side surfaces 60, 60 of the lens block 56. The cutouts 84 pass through the sidewalls 54 in a thickness direction and are opened in an inner surface and an outer surface of the sidewalls 54.

Further, the cutouts 84 extend in a thickness direction of the first circuit board 20 and the second circuit board 22 and are opened in peripheral edges, of the sidewalls 54, 54, located opposite the first circuit board 20 and the second circuit board 22.

In the side surfaces 60, 60 of the lens block 56, grooves 86, 86 in a semi-cylindrical shape extending in the thickness direction of the first circuit board 20 and the second circuit board 22 are formed.

Therefore, as shown in FIG. 6, the second adhesive portions 82, 82 are composed of portions 82a, 82a in a layer form (layer portions) between the sidewalls 54 and the side surfaces 60, portions 82b, 82b filling the inside of the cutouts 84, 84 (cutout filling portions), and portions 82c, 82c filling the inside of the grooves 86, 86 (groove filling portions). As a matter of fact, the layer portion 82a, the cutout filling portion 82b, and the groove filling portion 82c are integrated.

In the following, a description will be given of a preferable method of attaching the lens holder 50 and the lens block 56 to the first circuit board 20 at the time of the assembly of the optical module 10 of the first embodiment. It goes without saying that this attaching method is applicable also to the second circuit board 22.

First, the lens holder 50 is laser-welded to the base plate 42 of the first circuit board 20 on which the photoelectric conversion element array 44 and the integrated circuit 46 are mounted.

Figure 7:
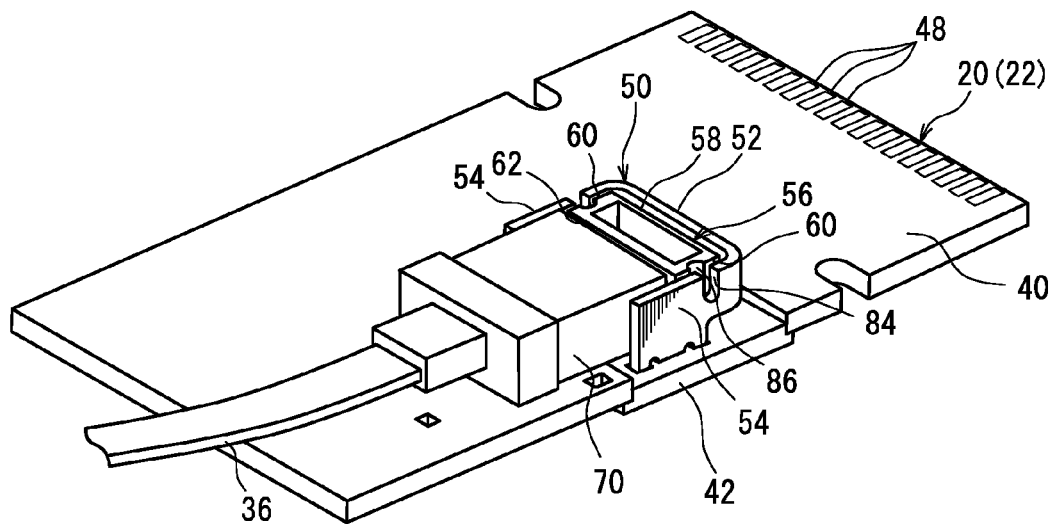
FIG. 7 is a schematic perspective view used to explain a method of attaching the lens block to a lens holder when the optical module in FIG. 2 is assembled.

Next, as shown in FIG. 7, the lens block 56 to which the MT ferrule 70 is joined is disposed in the lens holder 50. In this state, while the photoelectric conversion element array 44 is operated, a position of the lens block 56 is finely adjusted (alignment) so that optical coupling efficiency between the optical fibers in the optical fiber bundle 36 and the photoelectric conversion element array 44 becomes the highest.

At the time of the alignment, it is necessary to displace the lens block 56 from the lens holder 50 within a certain range. For this purpose, it is necessary to reserve a gap with a predetermined size between the end wall 52 and sidewalls 54 of the lens holder 50 and the rear surface 58 and sidewalls 60 of the lens block 56.

Then, at the position where the highest coupling efficiency is obtained, an ultraviolet cure adhesive is injected between the end wall 52 of the lens holder 50 and the rear surface 58 of the lens block 56 and between the sidewalls 54 of the lens holder 50 and the side surfaces 60 of the lens block 56. Then, the injected adhesive is cured by ultraviolet radiation, whereby the first adhesive portion 80 and the second adhesive portions 82, 82 are formed.

Then, the attachment of the lens holder 50 and the lens block 56 to the first circuit board 20 is finished.

After the first adhesive portion 80 and the second adhesive portions 82, 82 are formed, the ferrule holder 72 is fixed to the first circuit board 20 so as to surround the MT ferrule 70. At this time, the compression coil spring 74 is disposed between the ferrule holder 72 and the MT ferrule 70.

According to the optical module 10 of the first embodiment described above, the lens holder 50 has the cutouts 84 in the sidewalls 54, and the adhesive is also filled in the cutouts 84. A force acting on the lens block 56 based on a biasing force of the compression coil spring 74 is parallel to the sidewalls 54 of the lens holder 50 and the side surfaces 60 of the lens block 56.

Therefore, on boundaries between the layer portions 82a of the second adhesive portions 82 and the cutout filling portions (concavity/convexity filling portions) 82b, the force acting on the lens block 56 acts as a shear stress parallel to the boundaries. Then, at this time, as shown by the arrow in FIG. 8, the cutout filling portion 82b is supported by an axial force F1 from a wall surface of the cutout 84 which is vertical to the direction of the shear stress. Therefore, the side surfaces 60 of the lens block 56 are firmly supported via the cutout filling portions 82b by making use of rigidity of the sidewalls 54 of the lens holder 50.

As a result, according to this optical module 10, the lens block 56 is stably fixed by the lens holder 50 over a long period.

Further, according to the optical module 10 of the first embodiment described above, as a preferable mode, since the cutouts 84 pass through the sidewalls 54 of the lens holder 50, it is possible to expose the adhesive present between the sidewalls 54 and the side surfaces 60 to ultraviolet radiation through the cutouts 84. This facilitates assembling the optical module.

In addition, the cutouts 84 are formed easily by press molding or the like. Therefore, the optical module 10 has high productivity.

According to the optical module 10 of the first embodiment described above, as a preferable mode, the lens block 56 has the grooves 86 in the side surfaces 60 and the adhesive is filled also in the grooves 86. The force acting on the lens block 56 based on the biasing force of the compression coil spring 74 acts on the sidewalls 54 of the lens holder 50 from the side surfaces 60 of the lens block 56 and on boundaries between the layer portions 82a and the groove filling portions (convexity/concavity portions) 82c, it acts as a shear stress parallel to the boundaries.

Figure 8:
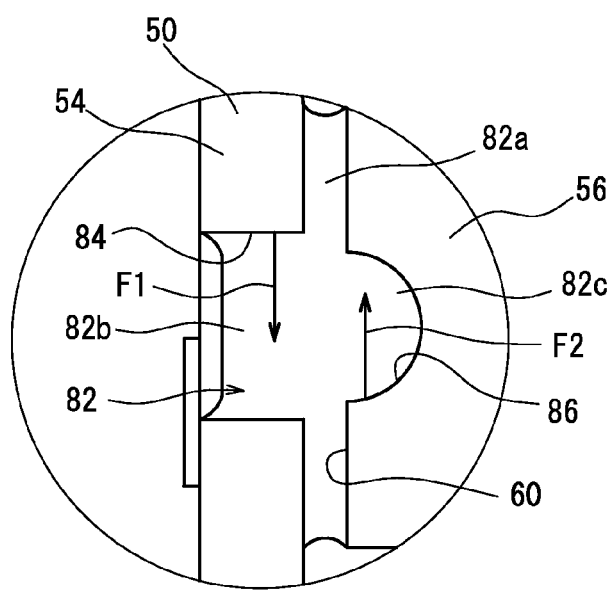
FIG. 8 is an enlarged plane view of an area VIII in FIG. 6.

Then, at this time, as shown by the arrow in FIG. 8, a wall surface of the groove 86 is not parallel to the direction of the shear stress and the groove filling portion 82c is pressed by an axial force F2 from the wall surface of the groove 86. Therefore, the force acting on the lens block 56 is efficiently and surely distributed to the sidewalls 60 of the lens holder 50 via the groove filling portions 82c.

As a result, according to this optical module 10, the lens block 56 is more stably fixed by the lens holder 50 over a long period.

[Second Embodiment]

Hereinafter, an optical module 100 of a second embodiment will be described with reference to the drawings. An outer appearance of the optical module 100 of the second embodiment is the same as the outer appearance of the optical module 10 of the first embodiment, and therefore, FIG. 2 also shows the optical module 100 of the second embodiment. Note that the same structures as those of the first embodiment will be denoted by the same reference numerals and symbols and a description thereof will be omitted.

Figure 9:
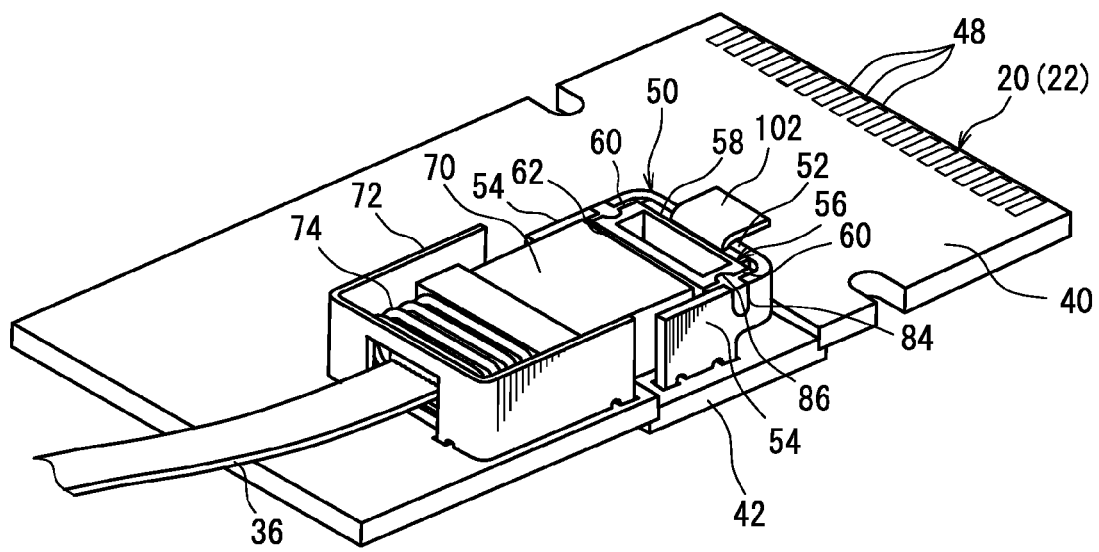
FIG. 9 is a schematic perspective view showing a first circuit board or a second circuit board employed in an optical module of a second embodiment together with components mounted thereon.

The optical module 100 of the second embodiment is different from the optical module 10 of the first embodiment in that it includes a spacer member 102 as shown in FIG. 9.

Figure 10:
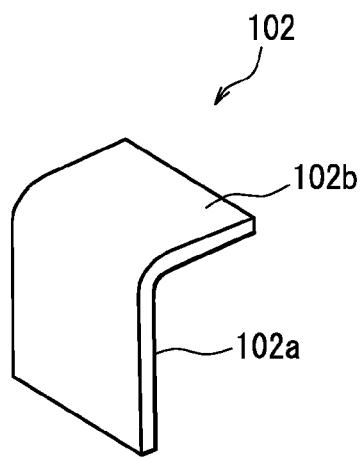
FIG. 10 is an enlarged schematic perspective view showing a spacer member in FIG. 9.

In more detail, the spacer member 102 has a main body portion 102a in a flat quadrangular plate shape made of, for example, metal as shown in FIG. 10.

As a preferable mode, the spacer member 102 has a hook portion 102b in a flat plate shape continuing from one side of the main body portion 102a at, for example, a right angle. Therefore, the spacer member 102 has an L-shaped cross section.

Figure 11:
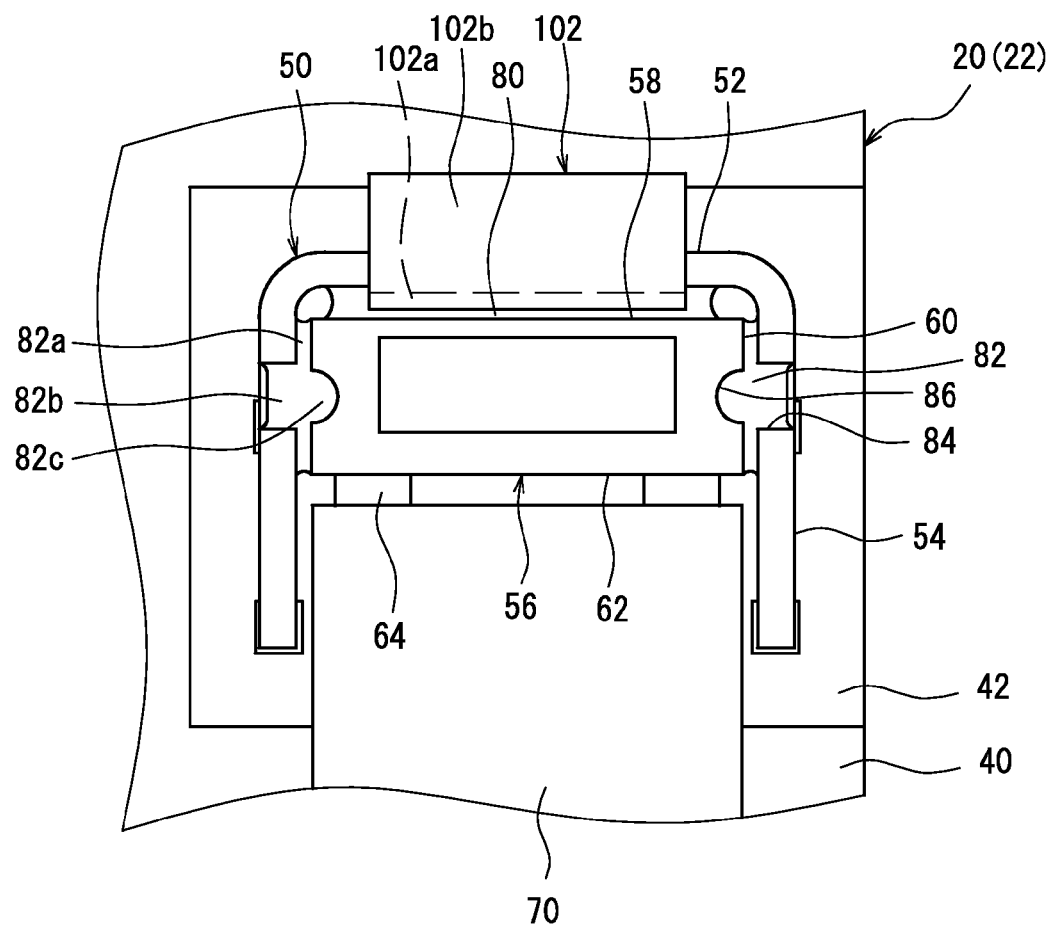
FIG. 11 is a plane view, corresponding to FIG. 8, of the optical module of the second embodiment.

As shown in FIG. 11, the main body portion 102a of the spacer member 102 is disposed between an end wall 52 of a lens holder 50 and a rear surface 58 of a lens block 56.

Hereinafter, a preferable method of attaching the lens holder 50 and the lens block 56 to a first circuit board 20 at the time of the assembly of the optical module 100 of the second embodiment will be described.

In this case, after the same alignment as that of the first embodiment is made, the main body portion 102a of the spacer member 102 is inserted between the end wall 52 of the lens holder 50 and the rear surface 58 of the lens block 56, at a position where the highest coupling efficiency is obtained.

Thereafter, an ultraviolet cure adhesive is injected between the end wall 52 of the lens holder 50 and the rear surface 58 of the lens block 56 and between sidewalls 54 of the lens holder 50 and side surfaces 60 of the lens block 56. Then, the injected adhesive is cured by ultraviolet radiation, whereby a first adhesive portion 80 and second adhesive portions 82, 82 are formed.

The optical module 100 of the second embodiment described above has the same effects as those of the optical module 10 of the first embodiment and further has the following effects.

First, according to the optical module 100 of the second embodiment, since the main body portion 102a of the spacer member 102 is disposed between the end wall 52 of the lens holder 50 and the rear surface 58 of the lens block 56, the first adhesive portion 80 present between the end wall 52 and the rear surface 58 becomes thin.

When the first adhesive 80 between the end wall 52 and the rear surface 58 becomes thin, the first adhesive portion 80 is deformed less when a force acts on the lens block 56 based on a biasing force of a compression coil spring 74, which increases durability of the first adhesive portion 80.

As a result, according to the optical module 100, the lens block 56 is more stably fixed by the lens holder 50 over a long period.

Further, according to the optical module 100 of the second embodiment described above, when the main body portion 102a of the spacer member 102 is inserted, the hook portion 102 abuts on or engages with an edge of the end wall 52 of the lens holder 50, so that the position of the spacer member 102 in the insertion direction is defined. Therefore, it is possible to easily assemble the optical module 100 without any problem such as the collision of the main body portion 102a with the integrated circuit 46 on the base plate 42.

The present invention is not limited to the above-described first embodiment and second embodiment and also includes modified forms of the above-described first and second embodiments.

For example, in the optical modules 10, 100 of the first and second embodiments described above, in the sidewalls 54 of the lens holder 50, the cutouts 84 passing through the sidewalls 54 are formed, but instead of the cutouts 84, grooves or depressions concave toward the side surfaces 60 may be formed in the sidewalls 54.

Alternatively, instead of the cutouts 84, ridges or projections projecting toward the side surfaces 60 may be formed in the sidewalls 54. Alternatively, instead of the cutouts 84, bulging portions concave or convex toward the side surfaces 60 may be formed in the sidewalls 54 by, for example, presswork.

In short, it is only necessary that concave/convex portions concave or convex toward the side surfaces 60 of the lens block 56 be formed in the sidewalls 54 of the lens holder 50. It should be noted that the number of the concave/convex portions is not particularly limited and may be plural.

Similarly, in the optical modules 10, 100 of the first and second embodiments, as a preferable mode, the grooves 86 are formed in the side surfaces 60 of the lens block 56, but dotted depressions, ridges, or projections instead of the grooves 86 may be formed. That is, as a preferable mode, convex/concave portions convex or concave toward the sidewalls 52 of the lens holder 50 may be formed. It should be noted that the number of the convex/concave portions is not particularly limited and may be plural.

Further, in the optical modules 10, 100 of the first and second embodiments described above, as a preferable mode, the ultraviolet cure adhesive is used, but a thermosetting adhesive may be used.

Further, in the optical module 100 of the second embodiment, the spacer member 102 has the hook portion 102b as a preferable mode, but the spacer 102 needs to have at least the main body portion 102a.

Further, in the first and second embodiments, the lens block 56 as an optical component optically couples the end portions of the plural optical fibers in the optical fiber bundle 36 and the photoelectric conversion element array 44, but the structure of the optical element in the lens block 56 is not particularly limited.

In the first and second embodiments, as a preferable mode, the first circuit board 20 and the second circuit board 22 each include the base plate 42, and on each of the base plates 42, the photoelectric conversion element array 44, the integrated circuit 46, and the lens holder 50 are mounted, but the base plates 42 may be omitted. In this case, the photoelectric conversion element array 44, the integrated circuit 46, and the lens holder 50 may be fixed to the board main body 40 of each of the first circuit board 20 and the second circuit board 22.

Finally, the present invention is applicable also to an optical transceiver to which an optical cable is attachable/detachable, and it is applicable not only to the optical transceiver but also to an optical module to which optical fibers are connected.

[Explanation Of Numerals And Symbols]
10, 100 optical module
20 first circuit board
22 second circuit board
36 optical fiber bundle
50 lens holder (support member)
52 end wall
54 sidewall
56 lens block (optical component)
58 rear surface
60 side surface
62 junction surface
70 MT ferrule (optical connector)
80 first adhesive portion
82 second adhesive portion
82a layer portion
82b cutout filling portion (concavity/convexity filling portion)
82c groove filling portion (convexity/concavity filling portion)
84 cutout (concave/convex portion)
86 groove (convex/concave portion)

What is claimed is:
1. An optical module comprising:
a circuit board;
a photoelectric conversion element mounted on said circuit board;
an optical component served for connection with an optical connector attached to an end portion of an optical fiber to optically couple the end portion of the optical fiber and said photoelectric conversion element, said optical component having a junction surface facing the optical connector and a pair of side surfaces apart from each other in a direction perpendicular to a connection direction of the optical connector; and a support member fixed to said circuit board and supporting said optical component, said support member having a pair of sidewalls and concave/convex portions, the sidewalls facing the side surfaces of said optical component respectively and being fixed to the side surfaces of said optical component via an adhesive, the concave/convex portions being provided in the sidewalls and concave or convex toward the side surfaces of said optical component, and the adhesive being applied also on surfaces of the concave/convex portions.

2. The optical module according to claim 1, wherein the concave/convex portions pass through the sidewalls in the direction in which the sidewalls are apart from each other.

3. The optical module according to claim 2, wherein the adhesive is of an ultraviolet curing type.

4. The optical module according to claim 3, wherein the side surfaces of said optical component each have a convex/concave portion convex or concave toward the sidewalls, and the adhesive is applied on surfaces of the convex/concave portions.

5. The optical module according to claim 4, wherein:
said optical component has a rear surface located opposite the junction surface in terms of the connection direction of the optical connector;
said support member has an end wall facing the rear surface of said optical component; and
the rear surface of said optical component is fixed to the end wall of said support member via an adhesive,
the optical module further comprising
a spacer member disposed between the rear surface of said optical component and the end wall.

6. The optical module according to claim 5, wherein said spacer member has a hook portion engaged with the end wall.

7. The optical module according to claim 1, wherein the side surfaces of said optical component each have a convex/concave portion convex or concave toward the sidewalls, and the adhesive is applied on surfaces of the convex/concave portions.

8. The optical module according to claim 7, wherein:
said optical component has a rear surface located opposite the junction surface in terms of the connection direction of the optical connector;
said support member has an end wall facing the rear surface of said optical component; and
the rear surface of said optical component is fixed to the end wall of said support member via an adhesive,
the optical module further comprising
a spacer member disposed between the rear surface of said optical component and the end wall.

9. The optical module according to claim 8, wherein said spacer member has a hook portion engaged with the end wall.

10. The optical module according to claim 2, wherein the side surfaces of said optical component each have a convex/concave portion convex or concave toward the sidewalls, and the adhesive is applied on surfaces of the convex/concave portions.

11. The optical module according to claim 10, wherein:
said optical component has a rear surface located opposite the junction surface in terms of the connection direction of the optical connector;
said support member has an end wall facing the rear surface of said optical component; and
the rear surface of said optical component is fixed to the end wall of said support member via an adhesive,
the optical module further comprising
a spacer member disposed between the rear surface of said optical component and the end wall.

12. The optical module according to claim 11, wherein said spacer member has a hook portion engaged with the end wall.

13. The optical module according to claim 1, wherein:
said optical component has a rear surface located opposite the junction surface in terms of the connection direction of the optical connector;
said support member has an end wall facing the rear surface of said optical component; and
the rear surface of said optical component is fixed to the end wall of said support member via an adhesive,
the optical module further comprising
a spacer member disposed between the rear surface of said optical component and the end wall.

14. The optical module according to claim 13, wherein said spacer member has a hook portion engaged with the end wall.

15. The optical module according to claim 2, wherein:
said optical component has a rear surface located opposite the junction surface in terms of the connection direction of the optical connector;
said support member has an end wall facing the rear surface of said optical component; and
the rear surface of said optical component is fixed to the end wall of said support member via an adhesive,
the optical module further comprising
a spacer member disposed between the rear surface of said optical component and the end wall.

16. The optical module according to claim 15, wherein said spacer member has a hook portion engaged with the end wall.

17. The optical module according to claim 3, wherein:
said optical component has a rear surface located opposite the junction surface in terms of the connection direction of the optical connector;
said support member has an end wall facing the rear surface of said optical component; and
the rear surface of said optical component is fixed to the end wall of said support member via an adhesive,
the optical module further comprising
a spacer member disposed between the rear surface of said optical component and the end wall.

18. The optical module according to claim 17, wherein said spacer member has a hook portion engaged with the end wall.

* * * * *